Nov. 30, 1954  A. M. STRANG  2,695,598
HYDRAULIC MOTOR

Filed Aug. 13, 1953  4 Sheets-Sheet 1

INVENTOR.
ANDREW M. STRANG
BY
ATTORNEY

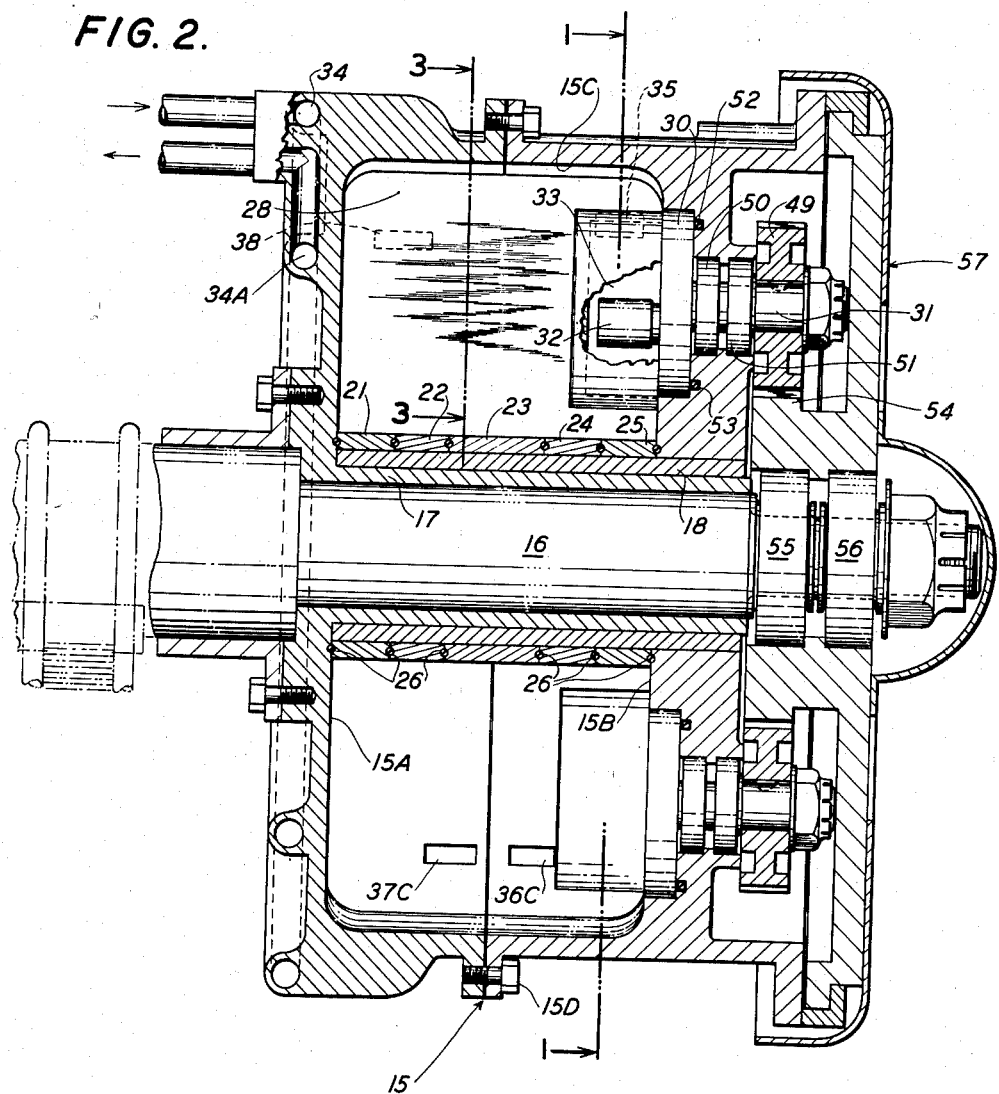

Nov. 30, 1954 A. M. STRANG 2,695,598
HYDRAULIC MOTOR
Filed Aug. 13, 1953 4 Sheets-Sheet 3

INVENTOR.
ANDREW M. STRANG
BY
ATTORNEY

Nov. 30, 1954

A. M. STRANG 2,695,598

HYDRAULIC MOTOR

Filed Aug. 13, 1953

INVENTOR.
ANDREW M. STRANG
BY

*ATTORNEY*

United States Patent Office

2,695,598
Patented Nov. 30, 1954

2,695,598

HYDRAULIC MOTOR

Andrew M. Strang, Hawthorne, Calif.

Application August 13, 1953, Serial No. 373,965

8 Claims. (Cl. 121—98)

This invention relates to hydraulic motors.

My invention contemplates a hydraulic motor having a housing with a shaft disposed therein, slip-rings mounted to rotate about the shaft, vanes extending from the inner surface of the housing to contact the slip-rings for dividing the housing into radial compartments, an impeller mounted in each compartment and pivoted on a slip-ring for movement from one side of the compartment to the other, means for admitting a fluid into the compartments to move the impellers, means for the fluid to leave the compartments, cranking means in each compartment actuated by the movement of the respective impeller, means for taking power from the several cranking means, and means for controlling fluid flow in and out of the compartments.

The motor of my invention is useful for taking power from a centrally located power source, say a pump, and delivering power hydraulically to a location removed from the central power source. For example, one of my motors can be attached to each of the wheels of a vehicle to provide independent power to the wheels. Thus, each wheel can be independently suspended from the body of the vehicle. The main engine of the vehicle drives a fluid pump to furnish a fluid to the hydraulic motors through flow lines. The speed of each motor is independently controlled by valves in the flow lines. Such an arrangement provides a versatile vehicle for traveling over rough terrain by virtue of the independent wheel suspension.

Another application of the motor of my design is in the aiming of relatively large guns. One motor can be attached to the gun barrel to control its elevation, and another motor can be attached to a rotary table on which the gun is mounted to control the azimuth of the gun barrel. The gun can be pointed and made to track a target by manipulation of the fluid supplied.

A clear understanding of my invention can be had from reference to the following detailed description taken in conjunction with the accompanying drawings in which:

Fig. 2 is a transverse vertical section taken on line 2—2 of Fig. 1;

Figure 1:
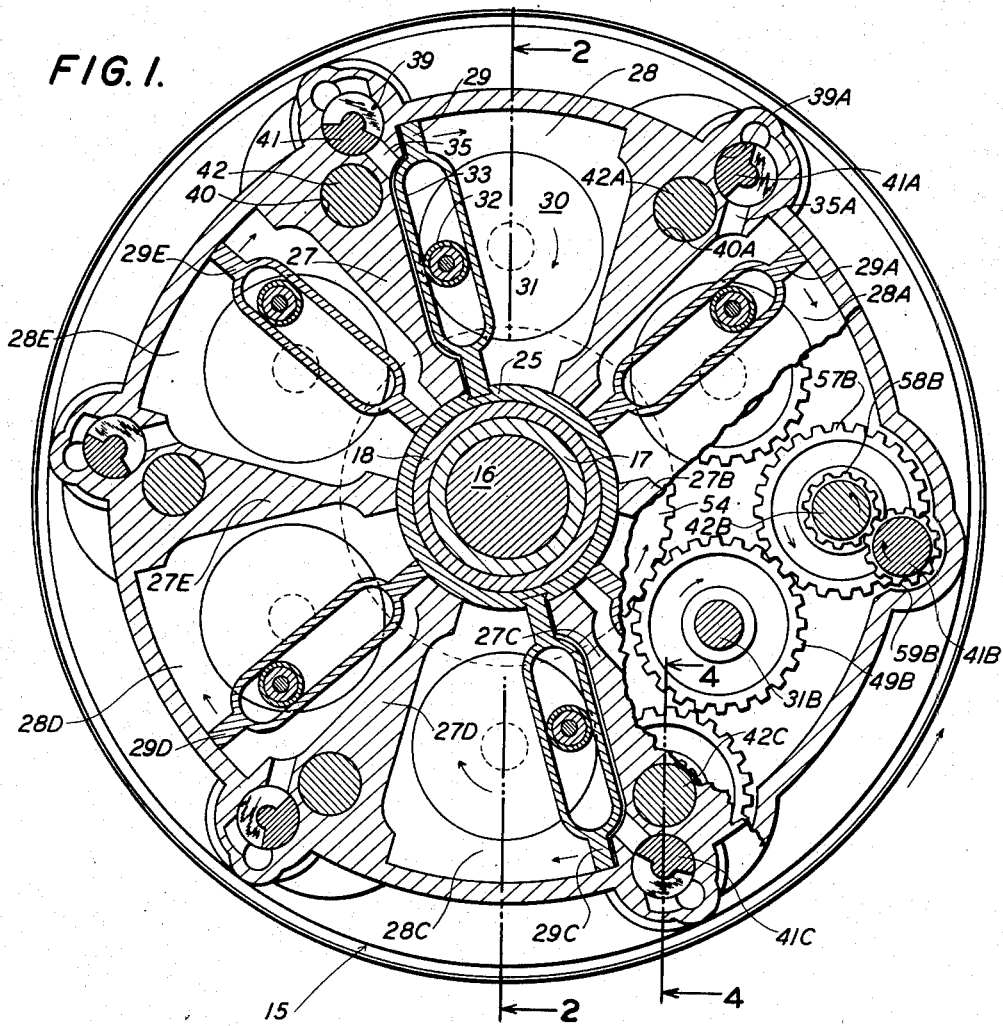
Fig. 1 is a vertical section of a preferred embodiment of the motor taken on the line 1—1 of Fig. 2.
Figure 3:
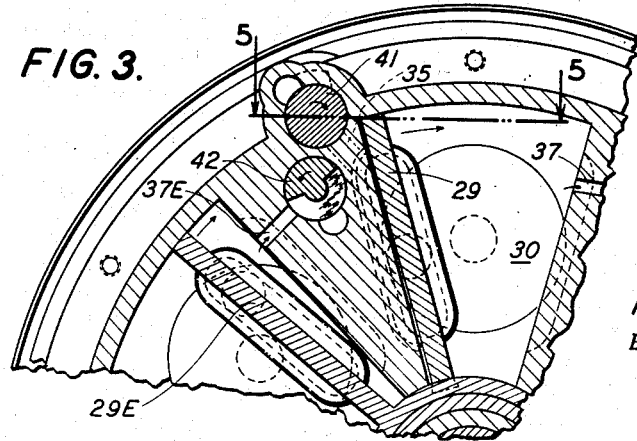
Fig. 3 is a partial vertical section taken on line 3—3 of Fig. 2.
Figure 4:
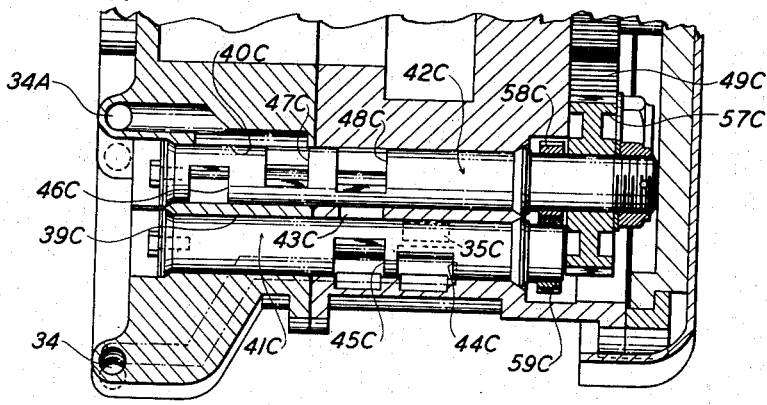
Fig. 4 is a partial section taken on line 4—4 of Fig. 1.
Figure 5:
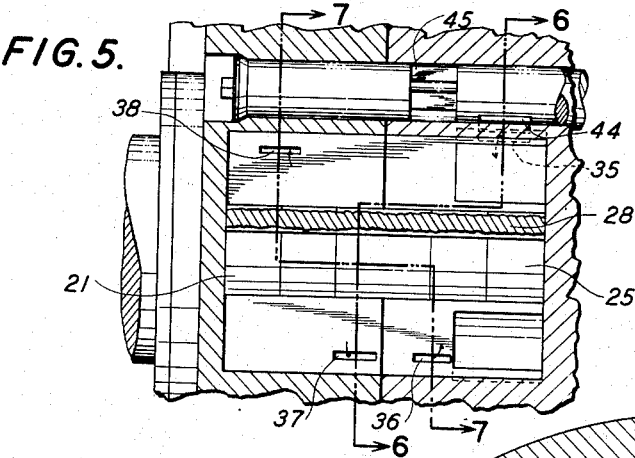
Fig. 5 is a section taken on line 5—5 of Fig. 3 and is revolved 90°.
Figure 7:
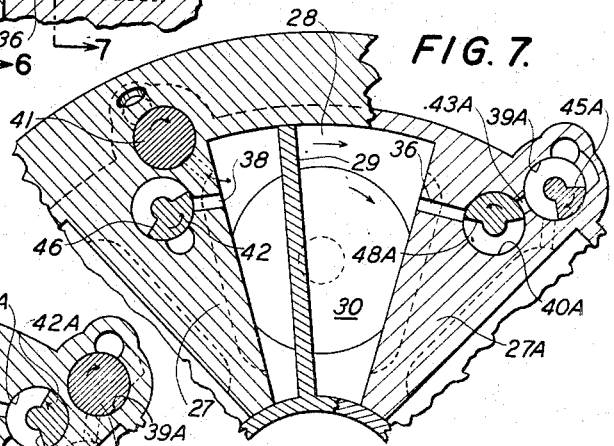
Fig. 7 is a section taken on the line 7—7 of Fig. 6.
Figure 6:
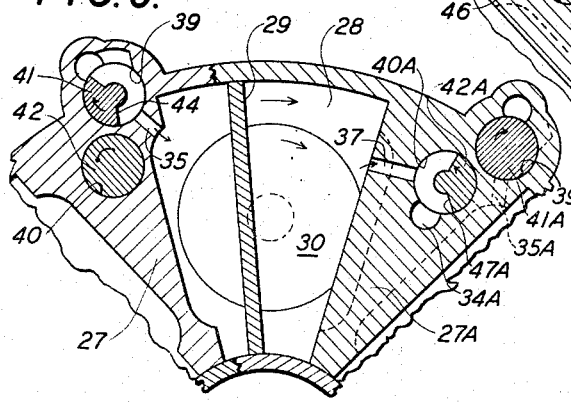
Fig. 6 is a vertical section taken on the line 6—6 of Fig. 5.

Referring to the drawings, the motor comprises a substantially enclosed cylindrical housing 15, having end walls 15A, 15B and a cylindrical side wall 15C. Conveniently the housing may be formed in two cylindrical sections and assembled as by bolts 15D.

A main shaft 16 extends through a hub 17 coaxially disposed within the housing. A sleeve bearing 18 is fitted over the hub. Slip-rings 21, 22, 23, 24, 25 are disposed adjacent to each other around the sleeve bearing within the housing. O-ring gaskets 26 are positioned at the ends of the slip-rings to provide a fluid seal between the slip-rings.

A plurality of vanes 27, 27A, 27B, 27C, 27D and 27E are formed integrally with the side wall of the housing and extend radially to seat against the slip-rings, thus forming a plurality of radially disposed compartments 28, 28A, 28B, 28C, 28D, 28E within the housing. Movable impellers 29, 29A, 29B, 29C, 29D, 29E are respectively mounted in each compartment so as to divide the respective compartments into two substantially fluid-tight chambers. One pair of diametrically opposite impellers 29 and 29C is attached to slip-rings 21, 25. Another pair of diametrically opposite impellers 29A, 29B is attached to slip-rings 22, 24 and the remaining pair of impellers is attached to slip-ring 23.

The several compartments and the associated elements are identical and the following description of compartment 28 serves as a description of each of the other compartments. A crank 30 is mounted in compartment 28 on an end of a shaft 31 journaled through end wall 15B of the housing. A crank pin 32 is mounted on the crank and engages in a slot 33 in impeller 29. An annular inlet manifold 34 is supported in housing wall 15A and provides means for introducing fluid under pressure to all of the compartments, fluid introduction to compartment 28 being through either of inlet ports 35, 36 during the proper cycle of motor operation. An annular exhaust manifold 34A is also supported in wall member 15A and provides for exhausing the compartments, exhaust from compartment 28 being through either of exhaust ports 37, 38.

Each of the compartment-defining vanes is provided with a pair of spaced parallel bores extending therethrough adjacent the outer end and parallel to the axis of rotation of the impellers. The bores 39, 40 and the bores 39A, 40A in the two vanes 27, 27A defining compartment 28 are illustrated in Fig. 4 and Figs. 6 through 9. These bores connect the inlet and exhaust manifolds to the respective inlet and exhaust ports. A rotatable valve shaft is disposed within each of the bores. The configuration and controllable angular position of the respective valve shafts determine ingress and egress of fluid into and from the respective compartments. Valve shafts 41, 42 in bores 39, 40 and valve shafts 41A, 42A in bores 39A, 40A are identified in the drawing. An exchange channel interconnects the two bores provided in each of the vanes, channel 43A connecting bores 39A and 40A in vane 27A during the proper part of the cycle of motor operation to admit fluid into the compartment through inlet port 36.

Inlet valve shaft 41 is notched at 44 for determining the opened and closed position for the inlet port 35 as the shaft revolves. Inlet valve shaft 41A contains a notch 45A which determines the opened and closed position of the exchange channel 43A at the inlet shaft end of the channel. The exhaust valve shaft 42 is notched at 46 for determining the opened and closed position of exhaust port 38. Exhaust valve shaft 42A has a notch 47A for determining the opened and closed position of exhaust port 37. It has another notch 48A for determining the opened and closed position of inlet port 36 and the open and closed position of the exchange channel at the exhaust valve shaft end of the channel.

A driving spur gear 49 is attached to the end of crank shaft 31 exterior to end wall 15B of the housing. The crank shaft is journaled in bearings 50, 51 in the end wall. The opening is sealed by the slidable contact between crank 30 and an O-ring 52 disposed in an annular groove 53 around the opening.

A flanged power take-off gear 54 mounted on roller bearings 55, 56 disposed on shaft 16 engages with the several driving gears. Power from gear 54 can be applied as desired. For example, a wheel mount 57 may be attached to the flange of the gear by bolts (not shown).

Rotation of the several valve shafts is provided by spur gears mounted thereon and engaging the respectively associated drive gears. In Fig. 1 spur gear 57B is attached adjacent the end of valve shaft 42B to engage with the driving gear 49B. A smaller second spur gear 58B is attached adjacent to spur gear 57B and engages with a third spur gear 59B mounted on valve shaft 41B.

The operation of the motor is described in connection with the cycle of a single one of the several impellers 29.

Figs. 6 through 9 illustrate most clearly the action of the valves to allow the fluid pressure to move the impeller back and forth across the compartment. Initially (see Figs. 6 and 7) the angular position of valve shaft 41 within bore 39 is such that passage is provided for the fluid from the inlet manifold to the compartment through inlet port 35. The impeller is forced across the compartment as the fluid enters, causing the crank within the compartment to rotate in a clockwise direction. The angular position of the valve shaft 42A is such that exhaust port 37 is open and fluid leaves the compartment through the exhaust port, bore 40A, and the outlet manifold 34A. Rotation of the crank by the impeller causes the driving gear to rotate and drive the power take-off gear. The driving gear also turns the spur gears attached to the valve shafts which in turn cause the valve shafts to rotate together, but in opposite directions at the same speed. Thus, the inlet port is held open while the impeller is driven across the compartment to the side opposite the inlet port, and the exhaust port on the low pressure side of the compartment is also held open during this cycle. The slip-ring assembly attached to the impeller revolves around the sleeve on the main shaft, and maintains alignment of the impeller as it moves through the compartment.

Figure 8:
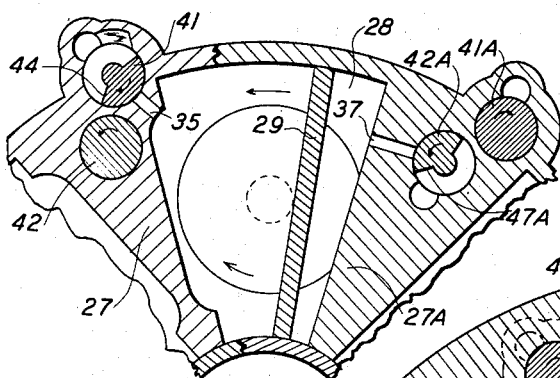
Fig. 8 is the same view as Fig. 6, except that it is taken at a different cycle in the operation of the motor.
Figure 9:
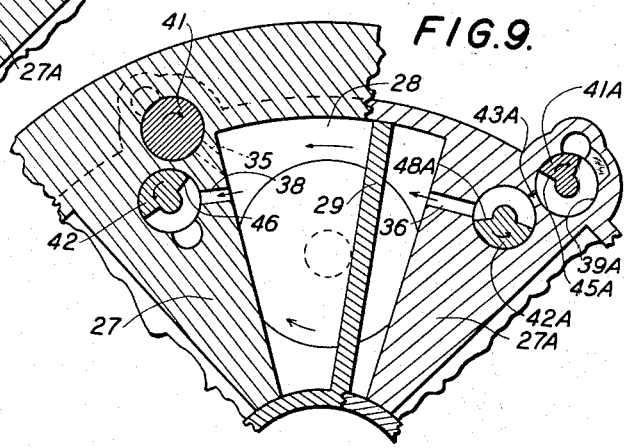
Fig. 9 is the same view as Fig. 7, except that it is taken at a different cycle in the operation of the motor.

As shown in Figs. 8 and 9 the impeller is returned from its extreme position adjacent vane 27A by virtue of the new angular position of the valve shafts. Inlet port 35 is now closed and exhaust port 37 is also closed. Valve shaft 41A has now revolved around so that exchange notch 45A in the shaft permits fluid to flow from bore 39A through exchange port 43A to inlet port 36, which is now open due to the new position of valve shaft 42A. Simultaneously, valve shaft 42 is now rotated so that exhaust port 38 is open. Thus the fluid pressure forces the impeller back across the compartment, causing the crank to continue to revolve in a clockwise direction.

The motor is stopped by turning off the supply of fluid to the high pressure manifold, or by closing a valve (not shown) in the exhaust manifold outlet.

It should be noted that diametrically opposed impellers are connected to the same slip-ring to form pairs of impellers which move together, guided by a common slip-ring assembly. It is an important feature of the invention that the impeller pairs are attached to separate slip-ring assemblies, and oscillate about the main shaft independently. This provides smoother power delivery to the power take-off gear and permits the impellers to be arranged with respect to each other so that the motor is never on "dead center," i. e., incapable of being operated without first requiring slight rotation of the moving parts by some means other than provided for normal operation of the motor.

The invention can be practiced by dividing the housing into either a larger or smaller number of compartments, but I have found that six compartments are to be preferred from the standpoint of smoothness of operations and simplicity of design.

The engine can be made to operate in reverse by simply supplying high pressure fluid to the exhaust manifold and allowing the inlet manifold to serve as the exhaust manifold.

I claim:

1. A hydraulic motor comprising a housing, a shaft disposed through the housing, slip-rings mounted to rotate about the shaft, radial vanes extending from the outer wall of the housing to engage the slip-rings for dividing the housing into compartments radially disposed about the shaft, an impeller in each compartment attached to a slip-ring for reciprocal movement between adjacent vanes and about the axis of the shaft, an inlet manifold for admitting a fluid into the compartments to move the impellers, an exhaust manifold for exhausting fluid from the compartments, crank means in each compartment actuated by movement of the respective impeller, means for taking power from the several crank means, and valving means responsive to the movement of the crank means for controlling fluid flow in and out of the compartments.

2. A hydraulic motor comprising a cylindrical housing, a shaft disposed coaxially through the housing, slip-rings mounted to rotate about the shaft, vanes extending from the inner surface of the housing to contact the slip-rings for dividing the housing into compartments radially disposed about the shaft, an impeller in each compartment attached to a slip-ring for reciprocal movement between adjacent vanes and about the axis of the shaft, an inlet manifold for admitting a fluid into the compartments to move the impellers, an exhaust manifold for exhausting fluid from the compartments, crank means in each compartment actuated by movement of the respective impeller, means for taking power from the several crank means, and valving means responsive to the movement of the crank means for controlling fluid flow in and out of the compartments.

3. A hydraulic motor comprising a cylindrical housing, a stationary shaft disposed coaxially through the housing, slip-rings mounted to rotate about the shaft, vanes extending from the inner surface of the housing to contact the slip-rings for dividing the housing into compartments radially disposed about the shaft, an impeller in each compartment attached to a slip-ring for reciprocal movement between adjacent vanes and about the axis of the shaft, an inlet manifold for admitting a fluid into the compartments to move the impellers, an exhaust manifold for exhausting fluid from the compartments, crank means in each compartment actuated by movement of the respective impeller, a power take-off gear rotatably mounted on the shaft and driven by the several crank means, and valving means responsive to the movement of the crank means for controlling fluid flow in and out of the compartments.

4. A hydraulic motor comprising a housing, a shaft disposed through the housing, slip-rings mounted to rotate about the shaft, vanes extending from the inner surface of the housing to contact the slip-rings for dividing the housing into compartments radially disposed about the shaft, an impeller in each compartment attached to a slip-ring for reciprocal movement between adjacent vanes and about the axis of the shaft, an inlet manifold for admitting a fluid into the compartments to move the impellers, an exhaust manifold for exhausting fluid from the compartments, crank means in each compartment actuated by movement of the respective impeller, means for taking power from the several crank means, and valving means in the vanes responsive to the movement of the crank means for controlling fluid flow in and out of the compartments.

5. A hydraulic motor comprising a housing, a shaft disposed through the housing, slip-rings mounted to rotate about the shaft, vanes extending from the inner surface of the housing to contact the slip-rings for dividing the housing into compartments radially disposed about the shaft, an impeller in each compartment attached to a slip-ring for reciprocal movement between adjacent vanes and about the axis of the shaft, an inlet manifold for admitting a fluid into the compartments, an exhaust manifold for exhausting fluid from the compartments, crank means in each compartment actuated by movement of the respective impeller, means for taking power from the several crank means, an inlet valve and exhaust valve in each vane respectively connected to the inlet and exhaust manifolds and to inlet and exhaust ports opening into the compartments lying on either side of the respective vane.

6. Apparatus according to claim 5 where the valves comprise a first rotatable valve shaft longitudinally disposed through each vane in a first bore connecting the inlet manifold with one of two inlet ports located on opposite sides of the vane respectively and with an exchange port within the vane, the first valve shaft being notched so that as it is rotated in the first bore, it alternately opens and closes the inlet port and the exchange port which connects the first bore with a second bore longitudinally disposed through each vane, the second bore connecting the exhaust manifold with the two exhaust ports located on opposite sides of the vane respectively and connecting the other inlet port to the exchange port, and a second valve shaft rotatably disposed within the second bore, the second valve shaft being notched so that as it is rotated in the bore, it opens and closes the exhaust ports and opens and closes the inlet port connected to the exhaust port.

7. A hydraulic motor comprising a housing, a shaft disposed through the housing, slip-rings mounted to rotate about the shaft, projections extending from the inner surface of the housing to contact the slip-rings for dividing the housing into compartments radially disposed about the shaft, an impeller in each compartment attached to a slip-ring for reciprocal movement between adjacent vanes and about the axis of the shaft, an inlet manifold for admitting a fluid into the compartments to move the impellers, an exhaust manifold for exhausting fluid from the compartments, crank means in each compartment actuated by movement of the respective impeller, means for taking power from the several crank means, an inlet valve and exhaust valve in each vane respectively connected to the inlet and exhaust manifolds and to inlet and exhaust ports opening into the compartments lying on either side of the respective vane, automatic means operable responsive to actuation of the crank means to cycle the several valves so that the impellers are continuously driven.

8. Apparatus according to claim 7 wherein the means cycling the valves maintains at least one pair of diametrically opposite impellers out of phase with respect to the other impellers.

References Cited in the file of this patent

UNITED STATES PATENTS

| Number | Name | Date |
|---|---|---|
| 725,087 | Jenney | Apr. 14, 1903 |
| 1,255,403 | Gardner et al. | Feb. 5, 1918 |

FOREIGN PATENTS

| Number | Country | Date |
|---|---|---|
| 14,280 | Great Britain | June 3, 1909 |